United States Patent
Lee et al.

(10) Patent No.: US 8,941,787 B2
(45) Date of Patent: Jan. 27, 2015

(54) THREE-DIMENSIONAL IMAGE DISPLAY DEVICE AND DRIVING METHOD THEREOF

(71) Applicant: Samsung Display Co., Ltd., Yongin (KR)

(72) Inventors: Kwang Keun Lee, Osan-si (KR); Mun-Ki Sim, Seoul (KR); Seon-Tae Yoon, Seoul (KR); Jae Byung Park, Seoul (KR); Hae Il Park, Seoul (KR); Hyun Min Cho, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 77 days.

(21) Appl. No.: 13/886,587

(22) Filed: May 3, 2013

(65) Prior Publication Data

US 2014/0146251 A1    May 29, 2014

(30) Foreign Application Priority Data

Nov. 27, 2012    (KR) .................. 10-2012-0135387

(51) Int. Cl.
    *G02F 1/13*    (2006.01)
    *G02B 27/26*   (2006.01)
(52) U.S. Cl.
    CPC .............. *G02B 27/26* (2013.01); *G02F 1/1313* (2013.01)
    USPC ........................................................ 349/15
(58) Field of Classification Search
    USPC ........................................................ 349/15
    See application file for complete search history.

(56) References Cited

U.S. PATENT DOCUMENTS

| 7,170,482 B2 | 1/2007 | Okita |
| 7,388,630 B2 | 6/2008 | Shin et al. |
| 8,054,282 B2 | 11/2011 | Park et al. |

(Continued)

FOREIGN PATENT DOCUMENTS

| EP | 0749249 A1 | 12/1996 |
| JP | 2001091922 A | 4/2001 |

(Continued)

OTHER PUBLICATIONS

Electronic Products, [online]; [retrieved on Jul. 16, 2013]; retrieved from the internet, http://www2.electronicproducts.com/MEMS_displays_aim_small_while_LCDs_get_big_bright-article-farcdisplays_jan2009-html.aspx, R. Comerford, "MEMS display aim small while LCDs get big & bright," Jan. 7, 2009, 5pp.

(Continued)

*Primary Examiner* — Phu Vu
(74) *Attorney, Agent, or Firm* — Cantor Colburn LLP

(57) ABSTRACT

A 3D image display device includes: a backlight unit including a first color light source and a second color light source, which are alternately turned on; a display panel on a front side of the backlight unit and including a pixel, where the pixel includes a first subpixel including a first color filter and a second subpixel including a second color filter; a patterned circular polarizer on a front side of the display panel, extending substantially in a first direction, and including a first circular polarization part and a second circular polarization part having widths substantially the same as widths of the first subpixel and the second subpixel, respectively; and glasses including a left lens and a right lens, where each of the left lens and the right lens includes a plurality of circular polarization patterns and a shutter glass panel which turns on and off each circular polarization pattern.

18 Claims, 17 Drawing Sheets

(56) References Cited

U.S. PATENT DOCUMENTS

2001/0045042 A1 11/2001 Dowzall et al.
2006/0221272 A1 10/2006 Negley et al.

FOREIGN PATENT DOCUMENTS

| | | |
|---|---|---|
| JP | 2002341334 A | 11/2002 |
| JP | 2002372953 A | 12/2002 |
| JP | 2003280614 A | 10/2003 |
| JP | 2005010510 A | 1/2005 |
| JP | 2007206635 A | 8/2007 |
| KR | 1019980004303 A | 3/1998 |
| KR | 1020010088285 A | 9/2001 |
| KR | 1020070002452 A | 1/2007 |
| KR | 1020070090427 A | 9/2007 |
| KR | 1020070119951 A | 12/2007 |

OTHER PUBLICATIONS

CNET, [online]; [retrieved on Jul. 19, 2013]; retrieved from the Internet; http://news.cnet.com/8301-13924_3-20018618-64.html., B. Crothers, "Hitachi aims MEMS display at tablets, smartphones," CNET-News, Nanotech—The Circuits Blog, Oct. 5, 2010, 2pp.

Laser Focus World, [online]; [retrieved on Jul. 16, 2013]; retrieved from the internet, http://www.laserfocusworld.com/articles/print/volume-47/issue-1/newsbreaks/pixtronix-micro-shutter-mems-display-consumes-much-less-power.html, LASERFOCUSWORLD, "Pixtronix-micro-shutter MEMS display consumes much less power," Jan. 1, 2011, 1p.

120Hz 2D Image

180Hz 3D Image

THREE-DIMENSIONAL IMAGE DISPLAY DEVICE AND DRIVING METHOD THEREOF

This application claims priority to Korean Patent Application No. 10-2012-0135387, filed on Nov. 27, 2012, and all the benefits accruing therefrom under 35 U.S.C. §119, the content of which in its entirety is herein incorporated by reference.

BACKGROUND (a) Field

Exemplary embodiments of the invention relate to a three-dimensional ("3D") image display device and a driving method of the 3D image display device.

(b) Description of the Related Art

Recently, services to be implemented with high speed of information based on a super-highway information network have been developed from services that allow viewers to listen and speak, such as telephones, to multi-media type services that allow viewers to watch and hear based on digital terminals that process texts, voices and images at high speed. The multi-media type services are expected to be developed to hyperspace realistic 3D info-communication services to realize realistically and stereoscopically watching and feeling without temporal and special limitations.

Generally, a 3D image, e.g., an image that allows a viewer to perceive a 3D depth, is configured based on a principle of a stereo vision through two eyes, and a binocular parallax, that is, a binocular disparity that occurs due to two eyes spaced apart from each other by about 65 millimeters may be the most important factor of a 3D effect. That is, left and right eyes watch different two-dimensional ("2D") images, respectively, and when the different 2D images are transferred to a brain through retina, the brain reproduces a depth perception and reality of a 3D image by combining the different 2D images. This is generally referred to as a stereography.

The 3D image display device uses the binocular disparity, and is typically classified into a stereoscopic type, such as a polarization type and a time division type, and an autostereoscopic type, such as a parallax-barrier type, a lenticular type and a blinking light type, with reference to whether or not a viewer wears separately provided glasses.

In the autostereoscopic type 3D image display device, a device of dividing a left-eye image and a right-eye image such as a lenticular lens layer is typically provided on a liquid crystal display. The autostereoscopic 3D image display device may allow a use to directly observe a screen to watch a 3D image without additional glasses, while an image transferred to a right eye and an image transferred to a left eye may not be effectively divided and thus the 3D effect may be deteriorated.

In the stereoscopic type 3D image display device, manufacturing cost may be increased as the glasses are used, while the 3D image may be perceived simultaneously by a number of viewers, and the 3D effect may be substantially improved by substantially accurately dividing the image transferred to the left eye and the image transferred to the right eye.

The stereoscopic type 3D image display device may use a shutter glass method, in which a 3D image is displayed in a high-speed driving mode by displaying the left-eye image and the right-eye image while maintaining resolution and turning on/off the glasses, and a film-type-patterned retarder ("FPR") method which displays the left-eye image and the right-eye image at the same time while reducing the resolution in half.

In the shutter glass method, the resolution may be substantially effectively maintained, while high-speed driving is used. In the FPR method, the resolution is typically substantially reduced, e.g., reduced in half.

SUMMARY

Exemplary embodiments of the invention relate to a display device and a driving method of the display device, in which resolution is effectively prevented from being deteriorated when a three-dimensional ("3D") image is displayed, and the 3D image is displayed at a relatively low frequency.

An exemplary embodiment of the invention provides a 3D image display device including: a backlight unit including a first color light source and a second color light source, which are alternately turned on; a display panel disposed on a front side of the backlight unit and including a pixel, where the pixel includes a first subpixel including a first color filter and a second subpixel including a second color filter; a patterned circular polarizer disposed on a front side of the display panel, extending substantially in a first direction, and including a first circular polarization part and a second circular polarization part having widths substantially the same as widths of the first subpixel and the second subpixel, respectively; and glasses including a left lens and a right lens, where each of the left lens and the right lens includes a plurality of circular polarization patterns and a shutter glass panel which turns on and off each circular polarization pattern.

In an exemplary embodiment, the first circular polarization part may transmit right circularly polarized light and the second circular polarization part may transmit left circularly polarized light.

In an exemplary embodiment, the first circular polarization part and the second circular polarization part may include cholesteric liquid crystals.

In an exemplary embodiment, the first circular polarization part and the second circular polarization part may include an upper polarizer which transmits linearly polarized light in a predetermined direction; and a patterned $\lambda/4$ plate disposed on the upper polarizer, extending substantially in the first direction, and including a first $\lambda/4$ plate and a second $\lambda/4$ plate having slow axes, and the slow axis of the first $\lambda/4$ plate and the slow axis of the second $\lambda/4$ plate may be substantially perpendicular to each other.

In an exemplary embodiment, the plurality of circular polarization patterns may include a first pattern extending substantially in a second direction and which transmits left circularly polarized light, and a second pattern extending substantially in the second direction and which transmits right circularly polarized light.

In an exemplary embodiment, the second direction may coincide with the first direction or be vertical to the first direction.

In an exemplary embodiment, the plurality of circular polarization patterns of the glasses may include a patterned $\lambda/4$ plate extending substantially in the second direction and including a first $\lambda/4$ plate and a second $\lambda/4$ plate having slow axes; and a linear polarization layer disposed inside the patterned $\lambda/4$ plate, and the slow axes of the first $\lambda/4$ plate of the glasses and the second $\lambda/4$ plate of the glasses may be substantially perpendicular to each other.

In an exemplary embodiment, all of the first subpixel and the second subpixel may be alternately arranged substantially in a vertical direction and a horizontal direction.

In an exemplary embodiment, the first subpixel and the second subpixel may be substantially linearly arranged in the first direction.

In an exemplary embodiment, the first color light source may be a yellow light source, the second color light source may be a blue light source, the first color filter may be a cyan color filter, and the second color filter may be a magenta color filter.

Another exemplary embodiment of the invention provides a driving method of a 3D image display device including: displaying a first colored left-eye image by a pixel; displaying a first colored right-eye image by the pixel; and displaying a second colored right-eye image and a second colored left-eye image by a first subpixel and a second subpixel of the pixel, respectively, where the 3D image display device includes: a backlight unit including a first color light source and a second color light source, which are alternately turned on and off; a display panel disposed on a front side of the backlight unit and including the pixel, where the pixel of the display panel includes the first subpixel including a first color filter, and the second subpixel including a second color filter; a patterned circular polarizer disposed on a front side of the display panel, where the patterned circular polarizer includes a first circular polarization part and a second circular polarization; and glasses including a left lens and a right lens, where each of the left lens and the right lens includes a plurality of circular polarization patterns and a shutter glass panel which turns on and off each circular polarization pattern, and where the first color of the first colored left-eye image and the first colored right-eye image is acquired by combining the color of a first color filter and a color of the second color filter of the pixel.

In an exemplary embodiment, the displaying the first colored left-eye image may include turning off the right lens of the glasses, and turning on the left lens.

In an exemplary embodiment, the displaying the first colored right-eye image may include turning off the left lens of the glasses, and turning on the right lens.

In an exemplary embodiment, the displaying the second colored right-eye image and the second colored left-eye image by the first subpixel and the second subpixel, respectively, may include: transmitting only first circularly polarized light through the left lens of the glasses; and transmitting only second circularly polarized light through the right lens of the glasses.

In an exemplary embodiment, the first circular polarization part and the second circular polarization part of the patterned circular polarizer may be disposed on the front side of the display panel, extend substantially in a first direction, and have widths substantially the same as the widths of the first subpixel and the second subpixel, respectively.

In an exemplary embodiment, the plurality of circular polarization patterns of the glasses may include a first pattern extending substantially in a second direction and which transmits left circularly polarized light, and a second pattern extending substantially in the second direction and which transmits right circularly polarized light.

In an exemplary embodiment, the left lens may be selectively opened to transmit one of the left circularly polarized light and the right circularly polarized light from the plurality of circular polarization patterns, and the right lens may be selectively opened to transmit the other of the left circularly polarized light and the right circularly polarized light from the plurality of circular polarization patterns.

In an exemplary embodiment, the first color light source may be a yellow light source, the second color light source may be a blue light source, the first color filter may be a cyan color filter, and the second color filter may be a magenta color filter.

According to the exemplary embodiments of the invention, the pixel of the display device includes two different colored subpixels, and a first color image for a left eye, a first color image for a right eye, and a second color image for two eyes are displayed in the backlight including two colored light sources, such that a 3D image is allowed to be displayed at a low frequency while substantially maintaining resolution.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
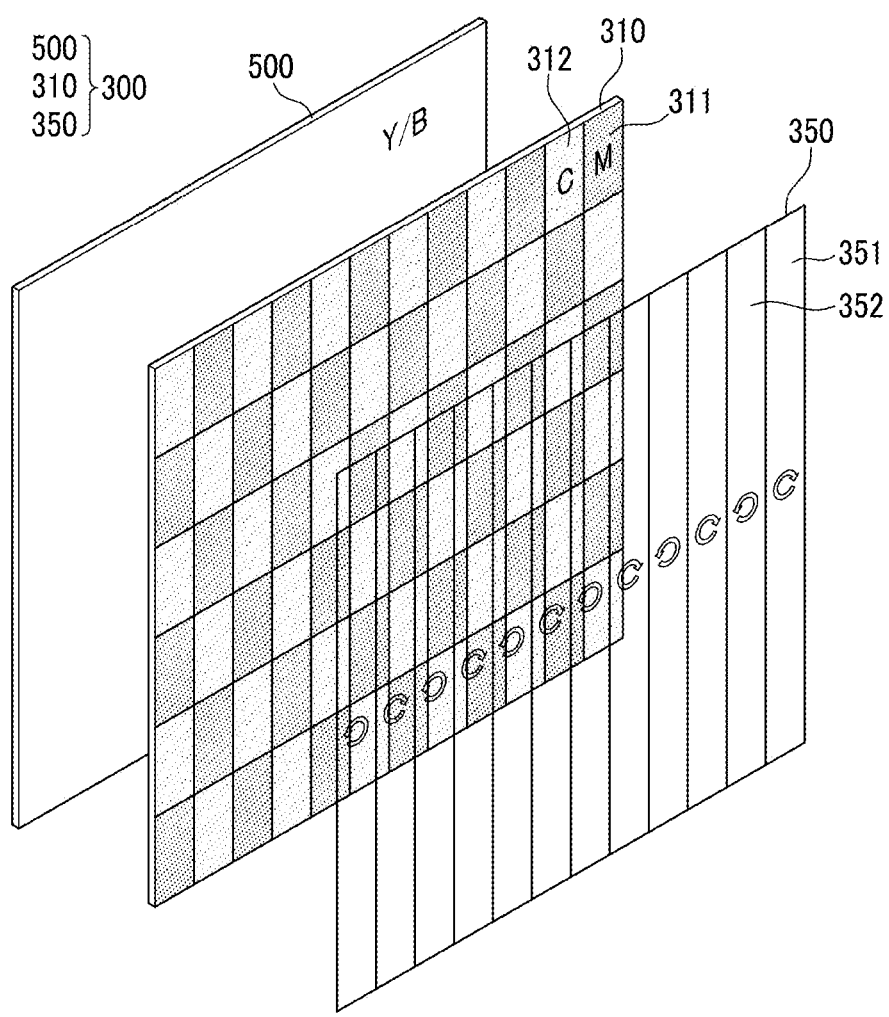
FIG. 1 is a schematic perspective view of an exemplary embodiment of a display device according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice.

Hereinafter, exemplary embodiments of a liquid crystal display according to the invention will be described in detail with reference to the accompanying drawings.

An exemplary embodiment of a three-dimensional ("3D") image display device according to the invention will be described in detail with reference to FIGS. 1 to 4. As shown in FIGS. 1 to 4, an exemplary embodiment of the 3D image display device includes a 3D image display panel 300 and glasses 200, and the 3D image display panel 300 and the glasses 200 are synchronized with each other.

First, the 3D image display panel 300 will be described with reference to FIGS. 1 and 2.

Figure 2:
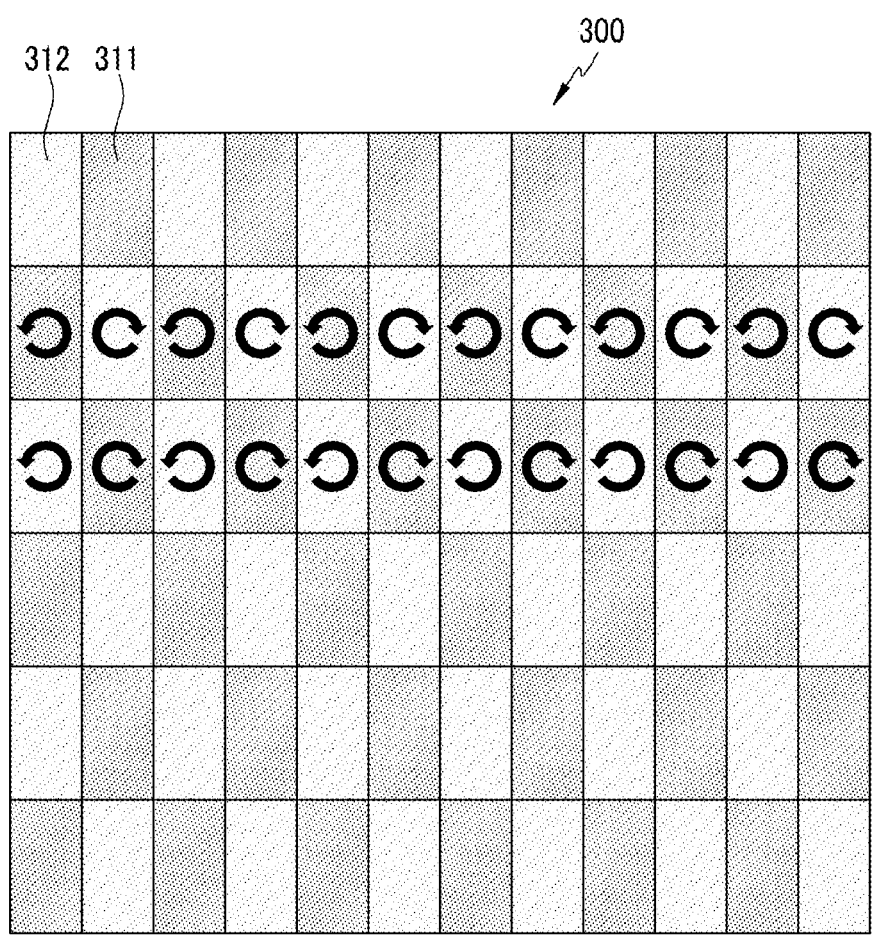
FIG. 2 is a schematic plan view of a subpixel in an exemplary embodiment of the display device according to the invention.

FIG. 1 is a schematic perspective view of an exemplary embodiment of a display device according to the invention, and FIG. 2 is a schematic plan view of a subpixel in an exemplary embodiment of the display device according to the invention.

The 3D image display panel 300 includes a backlight unit 500, a display panel 310, and a patterned circular polarizer 350 disposed on, e.g., attached to, a front side of the display panel 310.

The backlight unit 500, which is schematically illustrated in FIG. 1, may include a plurality of colored light sources, e.g., two colored light sources, and at least one of an optical sheet, a light guide plate and a reflective sheet for distributing light emitted from two colored light sources substantially uniformly in a display area. The two colored light sources in the backlight unit 500 may have various colors. In one exemplary embodiment, for example, as shown in FIG. 1, the backlight unit 500 may include a yellow Y light source and a blue B light source. In an exemplary embodiment, the two colored light sources are driven by time division. In such an embodiment, the yellow Y light source emits light in one frame, and the blue B light source emits light in the other frame, such that the yellow Y light source and the blue B light source alternately emit the light.

The display panel 310 is disposed on the backlight unit 500. In an exemplary embodiment of the invention, the display panel 310 is a liquid crystal panel, but not being limited thereto. In such an embodiment, the display panel 310 may include an upper substrate, a lower substrate, a pair of field generating electrodes, and a liquid crystal layer interposed between the upper and lower substrates. In such an embodiment, the display panel 310 may further include a lower polarizer disposed on, e.g., attached to, a lower side of the lower substrate and for transmitting predetermined linearly polarized light or circularly polarized light.

In such an embodiment, the lower substrate may include wirings (e.g., gate lines and data lines) for applying signals, a thin film transistor connected to the wirings, and a pixel electrode connected to an output terminal of the thin film transistor. A color filter may be provided in the lower substrate or the upper substrate, and includes two colored color filters. The colors of colored color filters may vary. In one exemplary embodiment, as shown in FIG. 1, the colors of the two colored filters may be magenta M and cyan C, but not being limited thereto. A common electrode which generates an electric field together with the pixel electrode may be provided in the lower substrate or the upper substrate.

In an exemplary embodiment of the display panel 310, one pixel includes two subpixels, and one subpixel 311 (hereinafter, referred to as a first subpixel) of two subpixels has a magenta M color filter, and the other subpixel 312 (hereinafter, referred to as a second subpixel) has a cyan C color filter.

In such an embodiment, two subpixels that collectively define one pixel display different colors. In an exemplary embodiment of the display panel 310, two subpixels which are laterally adjacent to each other may define one pixel, or two subpixels which are vertically adjacent to each other may define one pixel. Hereinafter, an exemplary embodiment, where the two subpixels which are laterally adjacent to each other define one pixel, will be described for convenience of description.

In an exemplary embodiment of the display panel 310, the subpixels are arranged substantially in a matrix form. In one exemplary embodiment, as shown in FIG. 1, adjacent subpixels are arranged to display different colors, but not being limited thereto. In an alternative exemplary embodiment, at least one of the adjacent subpixels may also display the same color.

The patterned circular polarizer 350 is disposed on, e.g., attached to, the front side of the display panel 310. In an exemplary embodiment, the patterned circular polarizer 350 is attached to the front side of the display panel 310, and the patterned circular polarizer 350 may be included in the display panel 310 as an element thereof.

The patterned circular polarizer 350 may have a characteristic for functioning as an upper polarizer of the display panel 310 corresponding to the lower polarizer of the display panel 310. In an exemplary embodiment, the lower polarizer transmits linearly polarized light or circularly polarized light, while the patterned circular polarizer 350 transmits the circularly polarized light.

In such an embodiment, the patterned circular polarizer 350 includes a first circular polarization part 351 and a second circular polarization part 352 which extend substantially in a vertical direction, and the first circular polarization part 351 and the second circular polarization part 352 are alternately arranged. The first circular polarization part 351 and the second circular polarization part 352 transmit circularly polarized light having different directions. In one exemplary embodiment, as shown in FIG. 1, the first circular polarization part 351 transmits right circularly polarized light, and the second circular polarization part 352 transmits left circularly polarized light. Right circularly polarized light is defined as a clockwise rotation of the electric vector of the light wave when an observer is looking against the direction the light wave is traveling, and the left circularly polarized light is defined as a counterclockwise rotation of the electric vector of the light when the observer is looking against the direction the light wave is traveling.

Referring to FIG. 2, in an exemplary embodiment, widths (horizontal widths) of the first circular polarization part 351 and the second circular polarization part 352 correspond to widths (horizontal widths) of a first subpixel 311 and a second subpixel 312 of the display panel 310. In such an embodiment, the first and second subpixels 311 and 312 that are horizontally adjacent to each other display different circularly polarized light.

In the display panel 310, since the subpixels that are vertically adjacent to each other display different colors, the first subpixels 311 in one row display the right circularly polarized light by the first circular polarization part 351, and the second subpixels 312 display the left circularly polarized light by the second circular polarization part 352. In such an embodiment, the first subpixels 311 in another row adjacent to the one row display the left circularly polarized light by the second circular polarization part 352, and the second subpixels 312 display the right circularly polarized light by the first circular polarization part 351.

In an exemplary embodiment, the first circular polarization part 351 and the second circular polarization part 352 of the patterned circular polarizer 350 may include cholesteric liquid crystals, and the cholesteric liquid crystals may be aligned to transmit only predetermined circularly polarized light based on a twist property thereof, but not being limited thereto. In an alternative exemplary embodiment, the first circular polarization part 351 and the second circular polarization part 352 may be provided to transmit predetermined circularly polarized light using various liquid crystal layers.

As described above, the 3D image display panel 300 has the patterned circular polarizer 350 on the front side of the display panel 310, such that the 3D image display panel 300 provides two images having different circular polarization directions.

When a viewer directly views the two images having different circular polarization directions as described above, since the viewer does not recognize the two images as divided two different images, the two images are recognized as a same image and thereby being displayed as a 2D image.

When the two images are divided into a left-eye image and a right-eye image by dividing different circular polarization directions to be applied to a left eye and a right eye, respectively, the viewer may view a 3D image.

In an exemplary embodiment, the glasses 200 may be used to divide the images having different circular polarizations, and an exemplary embodiment of the glasses 200 according to the invention will be described with reference to FIGS. 3 and 4.

Figure 3:
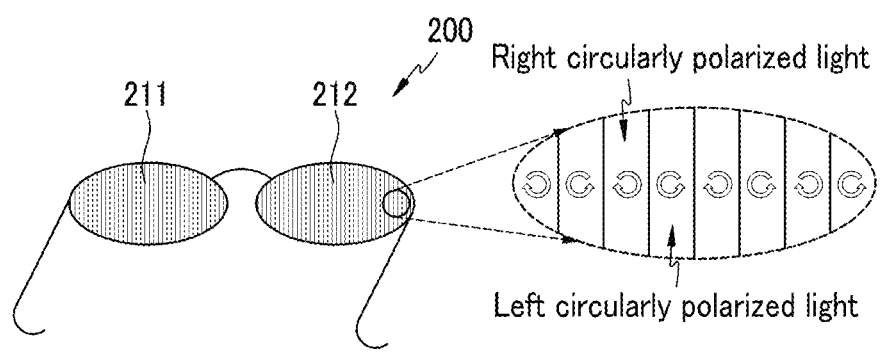
FIG. 3 is a schematic perspective view of an exemplary embodiment of 3D glasses according to the invention.
Figure 4:
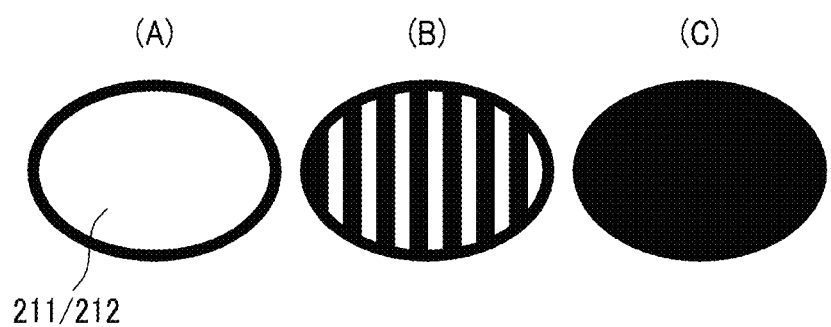
FIG. 4 is a schematic diagram illustrating an operation of lenses of an exemplary embodiment of the 3D glasses according to the invention.

FIG. 3 is a schematic perspective view of an exemplary embodiment of 3D glasses according to the invention, and FIG. 4 is a diagram illustrating an operation of lenses of an exemplary embodiment of the 3D glasses according to the invention.

First, as illustrated in FIG. 3, the 3D glasses 200 (hereinafter, will be referred to as "glasses" for convenience of description) include a left lens 211 and a right lens 212, and may further include connection parts that connect the left and right lenses 211 and 212 and temples to hang the glasses on ears.

Each of the lenses 211 and 212 has a plurality of circular polarization patterns and a shutter glass ("SG") panel that turns on and off a region corresponding to each circular polarization pattern.

The plurality of circular polarization patterns includes a first pattern which extends substantially in a vertical direction to transmit left circularly polarized light and a second pattern which extends substantially in the vertical direction to transmit right circularly polarized light. The first pattern and the second pattern are alternately arranged, and widths of the first pattern and the second pattern are substantially small such that each pattern may not be recognized by a viewer when the viewer wears the glasses 200.

The SG panel includes a liquid crystal layer and two electrodes for generating an electric field in the liquid crystal layer. The liquid crystal layer and the electrodes of the SG panel may be controlled based on regions corresponding to the first pattern and the second pattern (hereinafter, referred to as corresponding regions). In an exemplary embodiment, the electric field is generated in only one corresponding region, and the electric field may not be generated in an adjacent corresponding region. According to an exemplary embodiment, electric fields having different magnitudes may be applied to the adjacent corresponding region.

The plurality of circular polarization patterns is disposed on, e.g., attached to, an outer side (e.g., a side far away from the viewer's eyes) of the SG panel. The polarizer may also be attached to an opposite side (inner side) of the SG panel and may transmit linearly polarized light or circularly polarized light having a predetermined direction.

In an exemplary embodiment, the first pattern and the second pattern of the plurality of circular polarization patterns include cholesteric liquid crystals, and may be configured to transmit only predetermined circularly polarized light based on twist property of the cholesteric liquid crystal. In an alternative exemplary embodiment, the first pattern and the second pattern may be configured to transmit predetermined circularly polarized light using various liquid crystal layers.

Referring to FIG. 4, the plurality of circular polarization patterns and operation of the SG panel in a lens 211 or 212 of the glasses 200 are illustrated.

The lens 211 or 212 may be in a state where the lens 211 or 212 does not block but transmits the circularly polarized light transmitted through the plurality of circular polarization patterns as illustrated in (A) of FIG. 4, when the electric field is not applied to the SG panel. Hereinafter, the state, in which the lens 211 or 212 allows the circularly polarized light to pass therethrough, will be referred to as a "lens-on state."

When the electric field is applied to the SG panel, the lens 211 or 212 is in a state where the lens 211 or 212 blocks the circularly polarized light transmitted through the plurality of circular polarization patterns as illustrated in (C) of FIG. 4. Hereinafter, the state, in which the lens 211 or 212 blocks the circularly polarized light passing therethrough, will be referred to as a "lens-off state."

In such an embodiment, the electric field may be controlled for each corresponding region corresponding to the first pattern and the second pattern in the SG panel such that light passing through one pattern of the adjacent patterns may be transmitted and light passing through the other pattern may be blocked as illustrated in (B) of FIG. 4. In such an embodiment, the lens 211 or 212 may be in a state where the electric field in the lens 211 or 212 may be controlled such that light passing through the first pattern is transmitted and light passing through the second pattern is blocked, or light passing through the second pattern is transmitted and light passing through the first pattern is blocked. Hereinafter, the state of the lens 211 or 212, in which light passing through some patterns is transmitted, will be referred to as a "lens-selective-open state."

In an exemplary embodiment, the lenses 211 or 212 may be in the lens-on state, the lens-off state, or the lens-selective-open state.

In an alternative exemplary embodiment, the electric field may not be generated in the lenses 211 and 212 when the lens is in the lens-on, and the electric field may be generated in the lenses 211 and 212 when the lens is the lens-off state. In another alternative exemplary embodiment, the electric field is generated in the lens 211 or 212 when the lens 211 or 212 is in the lens-on state and the lens-off state, in which electric fields having different levels may be generated in the lens-on state and the lens-off state.

Exemplary embodiments of a method of displaying a 2D image and a 3D image using the 3D image display device will be described with reference to FIGS. 5 to 11.

First, an exemplary embodiment of a method of displaying a 2D image in the 3D image display device according to the invention will be described with reference to FIGS. 5 to 7.

Figure 5:
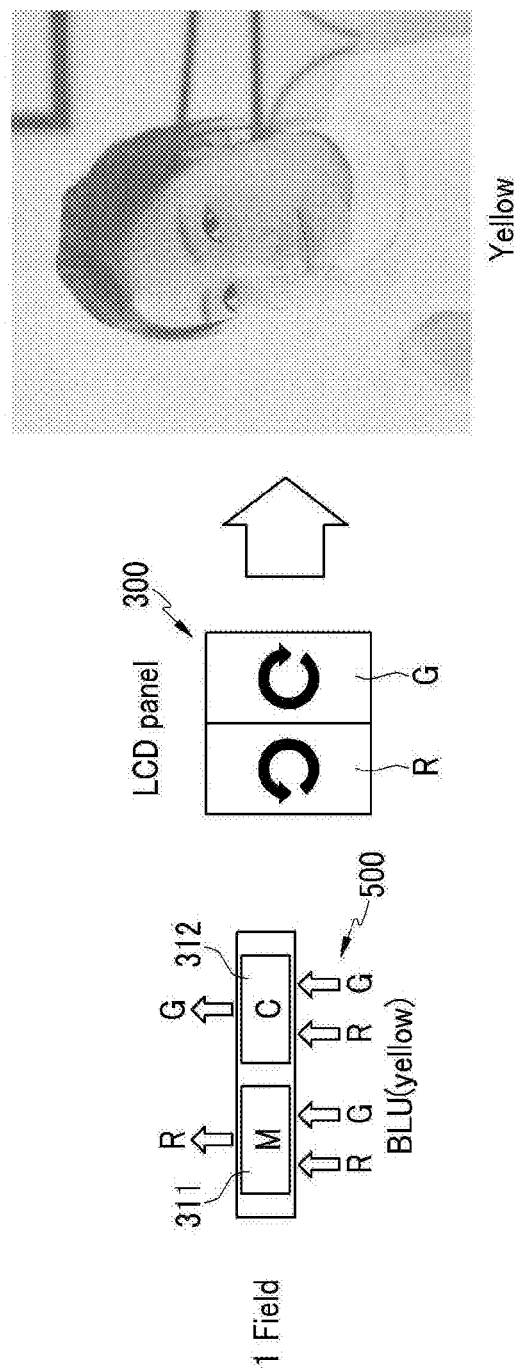
FIGS. 5 to 7 are diagrams illustrating an exemplary embodiment of a method of displaying a 2D image in the display device according the invention.
Figure 6:
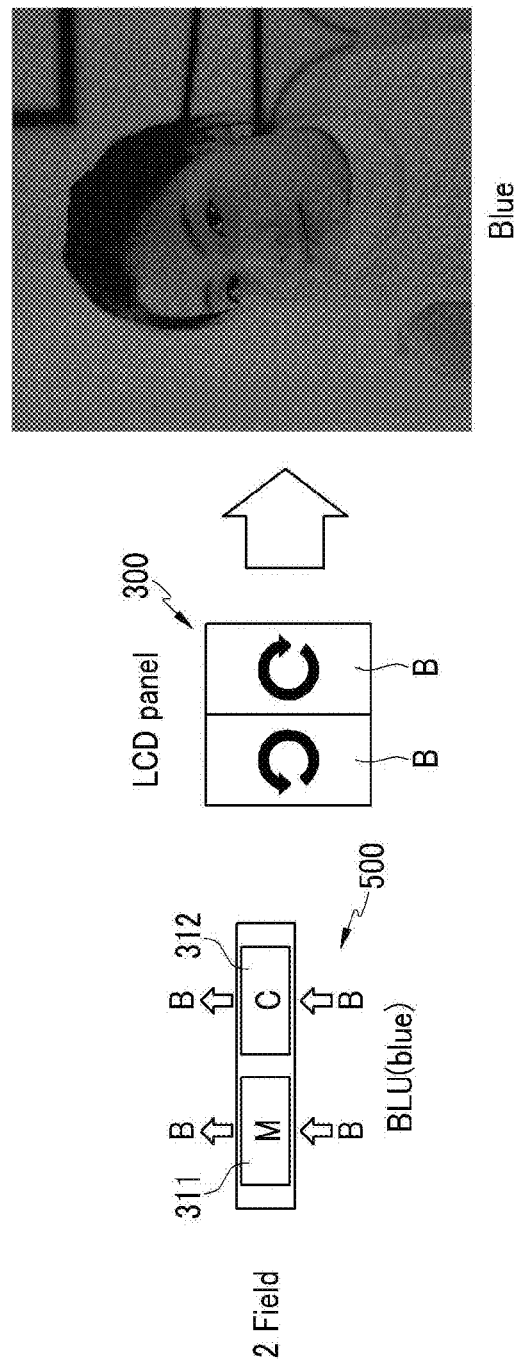
Figure 7:
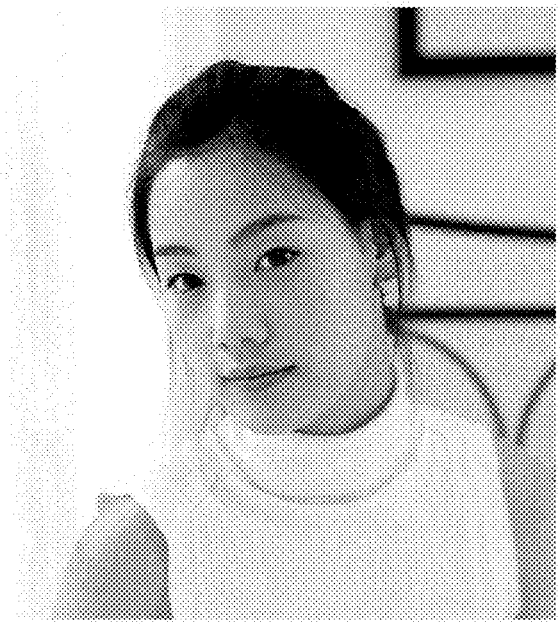

FIGS. 5 to 7 are diagrams illustrating an exemplary embodiment of a method of displaying a 2D image in the display device according to the invention.

When the display device displays the 2D image, a viewer views the 2D image without using the glasses 200. Hereinafter, an exemplary embodiment of a method of displaying an image on the 3D image display panel 300 will be described.

In a first frame (1 Field in FIG. 5), the 3D image display panel 300 displays an image as illustrated in FIG. 5, and in a second frame (2 Field in FIG. 6), the 3D image display panel 300 displays an image as illustrated in FIG. 6, such that the viewer may view the 2D image as illustrated in FIG. 7. In an exemplary embodiment, when a basic image display frequency is about 60 hertz (Hz), the image needs to be driven at a driving frequency of about 120 Hz as one image is displayed by combining the images displayed through two frames. In such an embodiment, the 2D image is displayed by displaying the image at a frequency twice the basic image display frequency. According to an exemplary embodiment, the basic image display frequency is not limited to about 60 Hz. In an alternative exemplary embodiment, the basic image display frequency may be higher or less than about 60 Hz.

First, an exemplary embodiment of a method of displaying an image in the 3D image display panel 300 of FIG. 5 will be described.

As illustrated in the leftmost drawing of FIG. 5, only a yellow Y light source of two colored light sources Y and B of the backlight unit ("BLU") 500 is turned on. As yellow Y may be acquired by combining red R and green G, red R light and green G light may be supplied from the BLU 500 in FIG. 5.

In an exemplary embodiment, different colors are displayed by two different colored subpixels of the display panel 310. In such an embodiment, red R may be displayed in the first subpixel 311 including a magenta M color filter, and green G may be displayed in the second subpixel 312 including a cyan C color filter. As the magenta M is acquired by combining red R and blue B, the magenta M color filter transmits red R component light and blue B component light. In such an embodiment, the yellow Y light supplied from the backlight unit 500 has only red R component light and green G component light such that only the red R light is transmitted through the magenta M color filter of the first subpixel 311. In such an embodiment, as cyan C is acquired by combining green G and blue B, the cyan C color filter transmits green G component light and blue B component light. In such an embodiment, the yellow Y light supplied from the backlight unit 500 has only red R component light and green G component light such that only the green G light is transmitted through the cyan C color filter of the second subpixel 312.

As shown by the drawing illustrated at the center of FIG. 5, the first subpixel 311 and the second subpixel 312 display red R and green G, respectively, and have different circular polarization characteristics based on the patterned circular polarizer 350 on the front side of each of the first and second subpixels 311 and 312, when viewed from a plan view.

In an exemplary embodiment, as shown in FIG. 5, the first subpixel 311 has a red left circular polarization characteristic, and the second subpixel 312 has a green right circular polarization characteristic. In an alternative exemplary embodiment, the first subpixel 311 may have a red right circular polarization characteristic, and the second subpixel 312 may have a green left circular polarization characteristic, based on a position of the subpixel.

In such an embodiment, a yellow Y image is displayed by combining red R light and green G light supplied from two subpixels of one pixel, as shown by "Yellow" at a lower part of the right drawing of FIG. 5.

In such an embodiment, the pixel of the 3D image display panel 300 includes subpixels that display red R and green G, respectively, in the first frame 1 Field, such that the yellow Y image is displayed.

In the second frame 2 Field, the 3D image display panel 300 displays the image as illustrated in FIG. 6.

As illustrated in the leftmost drawing of FIG. 6, only a blue B light source of the two colored light sources Y and B of the BLU 500 is turned on. As blue B is one of three primary colors of red, green and blue, in such an embodiment, only blue B light is supplied from the BLU 500 in FIG. 6.

In an exemplary embodiment, only the blue B is displayed by two different colored subpixels of the display panel 310. In such an embodiment, blue B is displayed in the first subpixel 311 including a magenta M color filter, and blue B is displayed in the second subpixel 312 including a cyan C color filter. In such an embodiment, as the magenta M is acquired by combining red R and blue B, the magenta M color filter transmits red R component light and blue B component light, such that blue B light supplied from the backlight unit 500 is transmitted through the magenta M color filter of the first subpixel 311 as it is. In such an embodiment, as cyan C is acquired by combining green G and blue B, the cyan C color filter transmits green G component light and blue B component light, such that the blue B light supplied from the backlight unit 500 is transmitted through the cyan C color filter of the second subpixel 312 as it is.

As shown in the drawing illustrated at the center of FIG. 6, each of the first subpixel 311 and the second subpixel 312 display blue B, and have different circular polarization characteristics according to the patterned circular polarizer 350 on the front side of each of the first and second subpixels 311 and 312, when viewed from a plan view.

In an exemplary embodiment, as shown in FIG. 6, the first subpixel 311 has a blue left circular polarization characteristic, and the second subpixel 312 has a blue right circular polarization characteristic, but not being limited thereto. In an alternative exemplary embodiment, the first subpixel 311 has a blue right circular polarization characteristic, and the second subpixel 312 has a blue left circular polarization characteristic, based on a position of the subpixel.

As described above, when two subpixels in one pixel supply the blue B light, the combined image has the blue B, as shown by "Blue" at a lower part of the right drawing of FIG. 6.

In an exemplary embodiment, the pixel in the 3D image display panel 300 includes subpixels, each of which displays blue B in the second frame 2 Field, such that a blue B image is displayed.

As described above, in such an embodiment where the first frame 1 Field of FIG. 5 and the second frame 2 Field are alternately displayed, a full colored image including all three primary colors of red, blue and green is displayed as shown in FIG. 7.

Hereinafter, an exemplary embodiment of a method of displaying a 3D image will be described with reference to FIGS. 8 to 11.

FIGS. 8 to 11 are diagrams illustrating an exemplary embodiment of a method of displaying a 3D image in the display device according to the invention.

When the display device displays the 3D image, a viewer uses the glasses 200. Hereinafter, an operation of the glasses will be described together with the method of displaying a 3D image.

Figure 8:
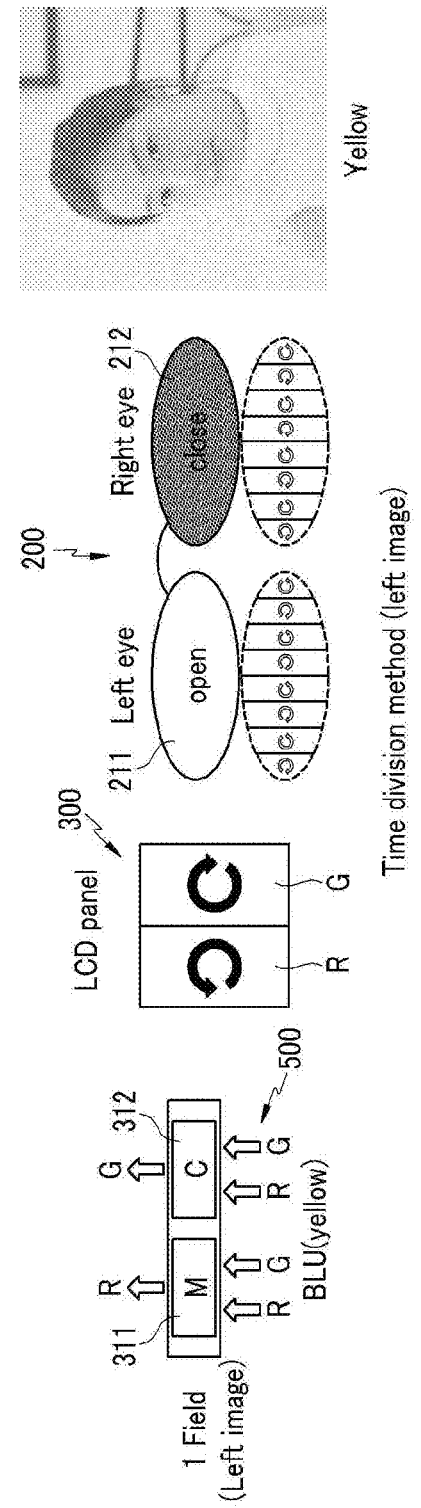
FIGS. 8 to 11 are diagrams illustrating an exemplary embodiment of a method of displaying a 3D image in the display device according to the invention.
Figure 9:
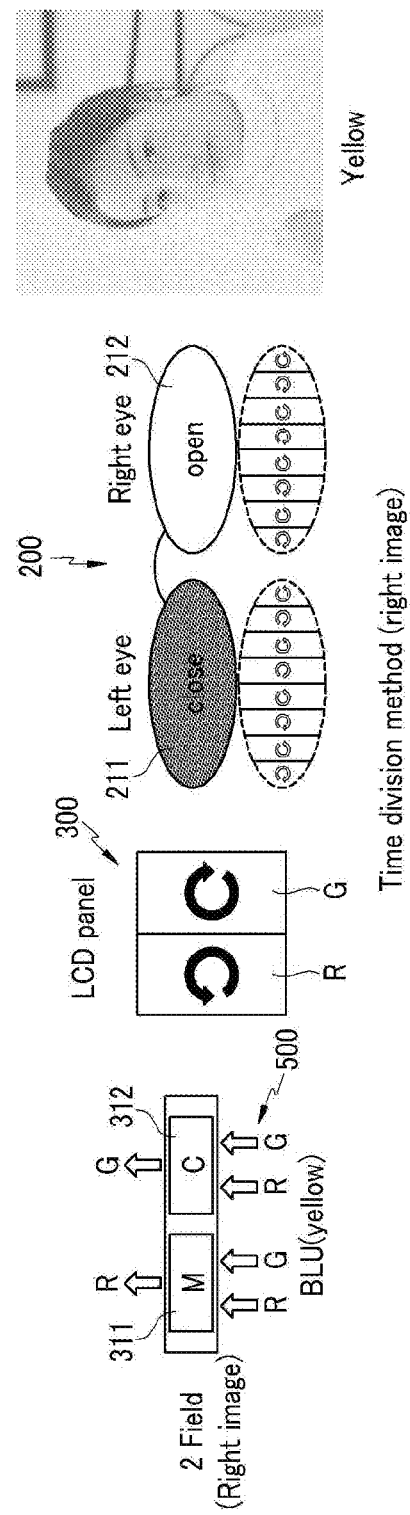
Figure 10:
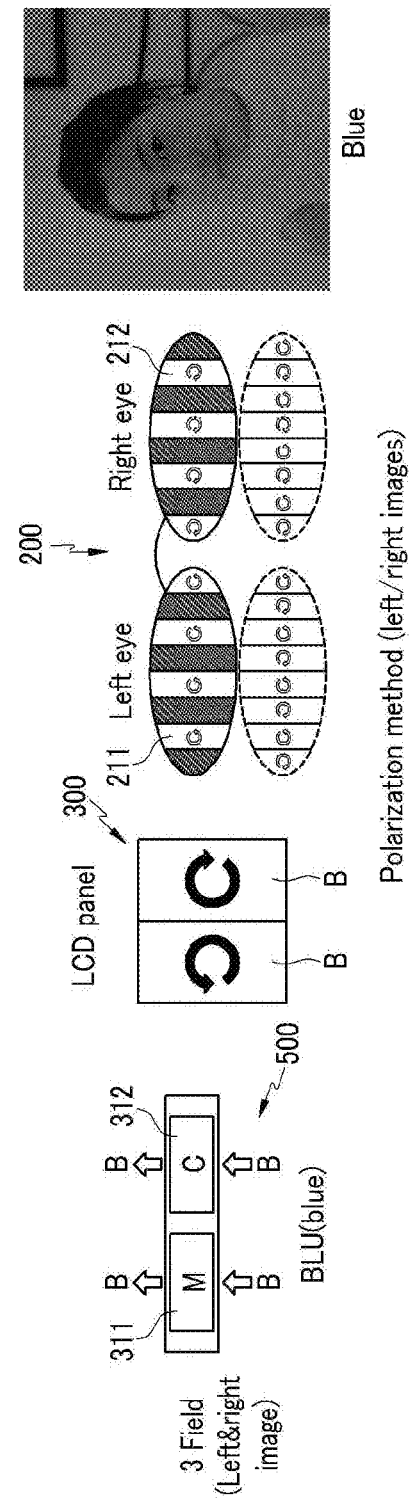

In a first frame (1 Field), as illustrated in FIG. 8, only a left-eye image is displayed on the 3D image display panel 300, and only a left lens 211 of the glasses 200 is turned on. In a second frame (2 Field), as illustrated in FIG. 9, only a right-eye image is displayed on the 3D image display panel 300, and only a right lens 212 of the glasses 200 is turned on. Thereafter, in a third frame (3 Field), as illustrated in FIG. 10, both the left-eye image and the right-eye image are displayed on the 3D image display panel 300, and both the left lens 211 and the right lens 212 of the glasses 200 are in the lens-selective-open-state such that the left-eye image passes through only the left lens 211 and the right-eye image passes through only the right lens 212.

Figure 11:

In such an embodiment, the viewer may view the 3D image through the three sequential frames. In such an embodiment, when a basic image display frequency is about 60 Hz, the image may be driven at a driving frequency of about 180 Hz, as illustrated in FIG. 11, as one 3D image is displayed by combining the images displayed through three frames, e.g., the first to third frames 1 Field to 3 Field. In such an embodiment, the 3D image is displayed at a frequency three times the basic image display frequency. According to an exemplary embodiment, the basic image display frequency may be greater than or less than about 60 Hz.

First, an exemplary embodiment of a method of supplying the 3D image by the 3D image display panel 300 and the glasses 200 will be described with reference to FIG. 8.

In FIG. 8, two left drawings illustrate the 3D image display panel 300, the second drawing from the right illustrates the glasses 200, and the rightmost drawing illustrates an image recognized by the viewer through the glasses 200.

As illustrated in FIG. 8, the 3D image display panel 300 displays the left-eye image in the first frame 1 Field.

As illustrated in the leftmost drawing of FIG. 8, only a yellow Y light source of two colored light sources Y and B of the BLU 500 is turned on. As yellow Y is acquired by combining red R and green G, red R light and green G light are supplied from the BLU 500 in FIG. 8.

In the first frame 1 Field, the display panel 310 displays only the left-eye image. In the first frame 1 Field, different colors are displayed by two different colored subpixels in the display panel 310. In such an embodiment, a red R left-eye image is displayed in the first subpixel 311 including a magenta M color filter, and a green G left-eye image is displayed in the second subpixel 312 including a cyan C color filter, as the magenta M is acquired by combining red R and blue B and the magenta M color filter transmits red R component light and blue B component light. In such an embodiment, the yellow Y light supplied from the BLU 500 has only red R component light and green G component light such that only the red R light is transmitted through the magenta M color filter of the first subpixel 311. As cyan C is acquired by combining green G and blue B, the cyan C color filter transmits green G component light and blue B component light. In such an embodiment, the yellow Y light supplied from the BLU 500 has only red R component light and green G component light such that only the green G light is transmitted through the cyan C color filter of the second subpixel As shown in the second drawing from the left of FIG. 8, the first subpixel 311 and the second subpixel 312 display the red R left-eye image and the green G left-eye image, respectively, and have different circular polarization characteristics according to the patterned circular polarizer 350 on the front side of each of the subpixels 311 and 312 when viewed from a plan view.

In an exemplary embodiment, as shown in FIG. 8, the first subpixel 311 has a red left circular polarization characteristic, and the second subpixel 312 has a green right circular polarization characteristic. In an alternative exemplary embodiment, the first subpixel 311 has a red right circular polarization characteristic, and the second subpixel 312 has a green left circular polarization characteristic, based on the position of the subpixel.

In such an embodiment, a yellow left-eye image is displayed by combining the red R left-eye image and the green G left-eye image from two subpixels in one pixel.

As described above, in the first frame 1 Field, the pixel included in the 3D image display panel 300 includes subpixels that display the red R left-eye image and the green G left-eye image, respectively, such that a yellow Y left-eye image is displayed.

In such an embodiment, in the glasses 200, the left lens 211 is in an lens-on state and the right lens 212 is in an lens-off state, as illustrated in the second drawing from the right of FIG. 8, such that the yellow Y left-eye image displayed in the 3D image display panel 300 is provided to the viewer's left eye.

The image provided to the viewer's left eye is illustrated at the right of FIG. 8, and since the image is the yellow image, as shown by "Yellow" at a lower part of the rightmost drawing of FIG. 8.

In such an embodiment, light supplied from all pixels of the display panel 310 is substantially transferred to the image provided to the left eye, such that resolution of the display panel 310 is effectively maintained, or effectively prevented from being reduced.

In the second frame 2 Field, the 3D image display panel 300 displays the right-eye image as illustrated in FIG. 9.

In FIG. 9, two left drawings illustrate the 3D image display panel 300, the second drawing from the right illustrates the glasses 200, and the rightmost drawing illustrates an image recognized by the viewer through the glasses 200.

As illustrated in the leftmost drawing of FIG. 9, only a yellow Y light source of two colored light sources Y and B of the BLU 500 is turned on. As yellow Y is acquired by combining red R and green G, red R light and green G light are supplied from the BLU 500 in FIG. 9.

In the second frame 2 Field, the display panel 310 displays only the right-eye image, and different colors are displayed by two different colored subpixels in the display panel 310. In such an embodiment, a red R right-eye image is displayed in the first subpixel 311 including a magenta M color filter, and a green G right-eye image is displayed in the second subpixel 312 including a cyan C color filter. As the magenta M is acquired by combining red R and blue B, the magenta M color filter transmits red R component light and blue B component light. In such an embodiment, the yellow Y light supplied from the BLU 500 has only red R component light and green G component light such that only the red R light is transmitted through the magenta M color filter of the first subpixel 311. As cyan C is acquired by combining green G and blue B, the cyan C color filter transmits green G component light and blue B component light. In such an embodiment, the yellow Y light supplied from the BLU 500 has only red R component light and green G component light such that only the green G light is transmitted through the cyan C color filter of the second subpixel 312.

As illustrated in the second drawing from the left of FIG. 9, the first subpixel 311 and the second subpixel 312 display the red R right-eye image and the green G right-eye image, respectively, and have different circular polarization characteristics according to the patterned circular polarizer 350 on the front side of each of the first and second subpixels 311 and 312, when viewed from a plan view.

In an exemplary embodiment, as shown in FIG. 9, the first subpixel 311 has a red left circular polarization characteristic, and the second subpixel 312 has a green right circular polarization characteristic. In an alternative exemplary embodiment, the first subpixel 311 has a red right circular polarization characteristic, and the second subpixel 312 has a green left circular polarization characteristic, based on a position of the subpixel.

In an exemplary embodiment, as described above, a yellow right-eye image is displayed by combining the red R right-eye image and the green G right-eye image provided from two subpixels in one pixel.

In such an embodiment, the pixel in the 3D image display panel 300 includes subpixels that display the red R right-eye image and the green G right-eye image, respectively, in the second frame 2 Field, such that a yellow Y right-eye image is displayed.

In such an embodiment, the right lens 212 of the glasses 200 is in an lens-on state and the left lens 211 of the glasses 200 is in an lens-off state, as illustrated in the second drawing from the right of FIG. 9, such that the yellow Y right-eye image displayed in the 3D image display panel 300 is provided to the viewer's right eye.

The image provided to the viewer's right eye is illustrated by the rightmost drawing of FIG. 9, and the image is represented by "Yellow" at a lower part of the right drawing of FIG. 9 as the image is the yellow image.

In such an embodiment, light from all pixels of the display panel 310 is substantially transferred to the image to be provided to the right eye, and resolution of the display panel 310 is thereby effectively maintained, or effectively prevented from being reduced.

The viewer views the yellow Y 3D image by combining the first frame 1 Field of FIG. 8 and the second frame 2 Field of FIG. 9. In such an embodiment, a third frame is further provided as illustrated in FIG. 10 as the yellow Y 3D image is not a full colored image.

Thereafter, in the third frame 3 Field, both the left-eye image and the right-eye image are displayed on the 3D image display panel 300, and the lenses 211 and 212 of the glasses 200 are in the lens-selective-open state.

In FIG. 10, two left drawings illustrate the 3D image display panel 300, the second drawing from the right illustrates the glasses 200, and the rightmost drawing illustrates an image recognized by the viewer through the glasses 200.

As illustrated in the leftmost drawing of FIG. 10, only a blue B light source of two colored light sources Y and B of the BLU 500 is turned on. Blue B is one of three primary colors of red, green and blue, and only blue B light is supplied from the BLU 500 in FIG. 6.

In such an embodiment, the display panel 310 displays both the left-eye image and the right-eye image in the third frame 3 Field. In such an embodiment, the same color is displayed by two different colored subpixels in the display panel 310, and the left-eye image and the right-eye image are simultaneously displayed.

In such an embodiment, a blue B right-eye image is displayed in the first subpixel 311 including a magenta M color filter, and a blue B left-eye image is displayed in the second subpixel 312 including a cyan C color filter.

In an exemplary embodiment, as illustrated in the second drawing from the left of FIG. 10, the first subpixel 311 and the second subpixel 312 display the blue B right-eye image and the blue B left-eye image, respectively, when viewed from a plan view. In an alternative exemplary embodiment, the first subpixel 311 may display the blue B left-eye image, and the second subpixel 312 may display the blue B right-eye image based on a position of the pixel.

In an exemplary embodiment, the left-eye image has a right circular polarization characteristic, and the right-eye image has a left circular polarization characteristic, such that the left-eye image and the right-eye image may selectively pass through the lenses 211 and 212 of the glasses 200 based on a polarization characteristic.

In such an embodiment, in the third frame (3 Field), the pixel in the 3D image display panel 300 includes subpixels that display the left-eye image having a blue B right circular polarization characteristic and display the right-eye image having a blue B left circular polarization characteristic such that the left-eye image having the blue B right circular polarization characteristic and the right-eye image having the left circular polarization characteristic are displayed by the 3D image display panel 300. In an alternative exemplary embodiment, the left-eye image may have the left circular polarization characteristic, and the right-eye image may have the right circular polarization characteristic.

In an exemplary embodiment, the left lens 211 and the right lens 212 of the glasses 200 are in a lens-selective-open state as illustrated in the second drawing from the right of FIG. 10. In such an embodiment, the left lens is selectively opened to transmit only the right circularly polarized light, and the right lens 212 is selectively opened to transmit only the left circularly polarized light.

In such an embodiment, the left-eye image having the blue B right circular polarization characteristic displayed in the 3D image display panel 300 passes through the left lens 211 to be provided to the viewer's left eye, and the right-eye image having the blue B left circular polarization characteristic passes through the right lens 212 to be provided to the viewer's right eye.

In such an embodiment, polarization characteristics of the lenses 211 and 212 of the glasses 200 are fixed to transmit the light having different circular polarization characteristics, and the polarization characteristics of the lenses 211 and 212 may be determined based on circular polarization characteristics of the left-eye image and the right-eye image in 3D image display panel 300.

The left-eye image and the right-eye image which are provided to the viewer's left eye and right eye are illustrated at the right of FIG. 10. In the third frame 3 Field, both the left-eye image and the right-eye image have the blue, as shown by "Blue" at a lower part of the right drawing of FIG. 10.

In such an embodiment, the images supplied to the left eye and the right eye receive blue information from each of all pixels of the display panel 310, respectively, and resolution of the displayed image is thereby effectively maintained, or effectively prevented from being reduced.

In such an embodiment, the image provided in the third frame of FIG. 10 displays the blue, which is a single color, and the viewer views the blue 3D image when the left-eye image is provided to the left eye and the right-eye image is provided to the right eye.

Therefore, when the first frame of FIG. 8, the second frame of FIG. 9, and the third frame of FIG. 10 are combined, the viewer views the full colored 3D image by combining the yellow Y 3D image and the blue B 3D image, as shown in FIG. 11.

An exemplary embodiment of the structure of the 3D image display device and the methods of displaying the 2D image and the 3D image according to the invention are described above, but not being limited thereto. In an alternative exemplary embodiment, the structure of the 3D image display device may be variously modified.

Hereinafter, an alternative exemplary embodiment of the 3D image display device and the methods of displaying the 2D image and the 3D image will be described with reference to FIGS. 12 to 18.

First, an alternative exemplary embodiment of the 3D image display panel 300 will be described with reference to FIGS. 12 to 14.

Figure 12:
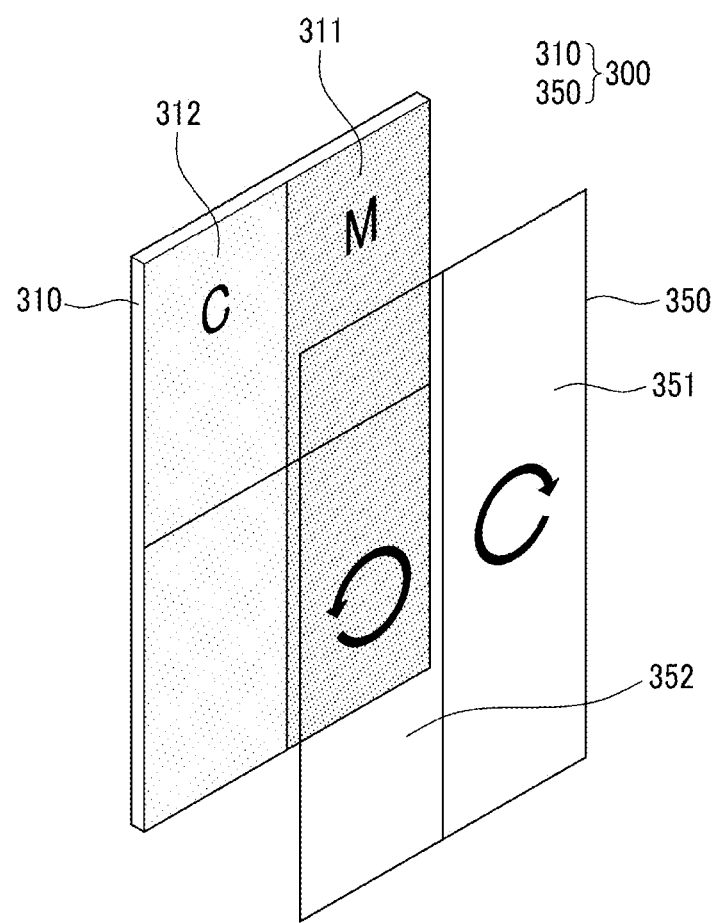
FIGS. 12 to 14 are enlarged perspective views schematically illustrating an alternative exemplary embodiment of a 3D image display panel according to the invention.
Figure 13:
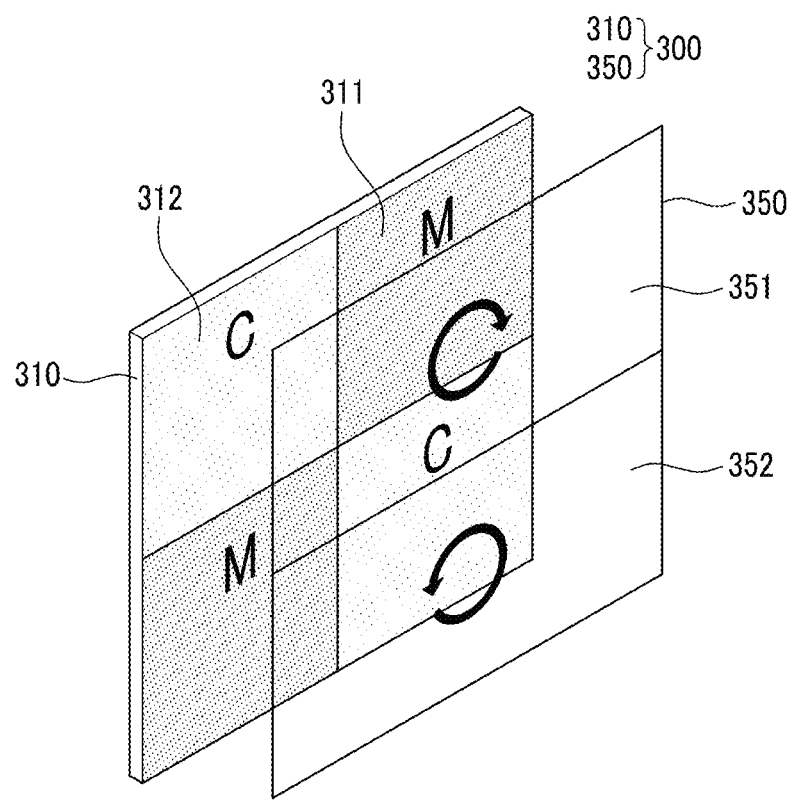
Figure 14:
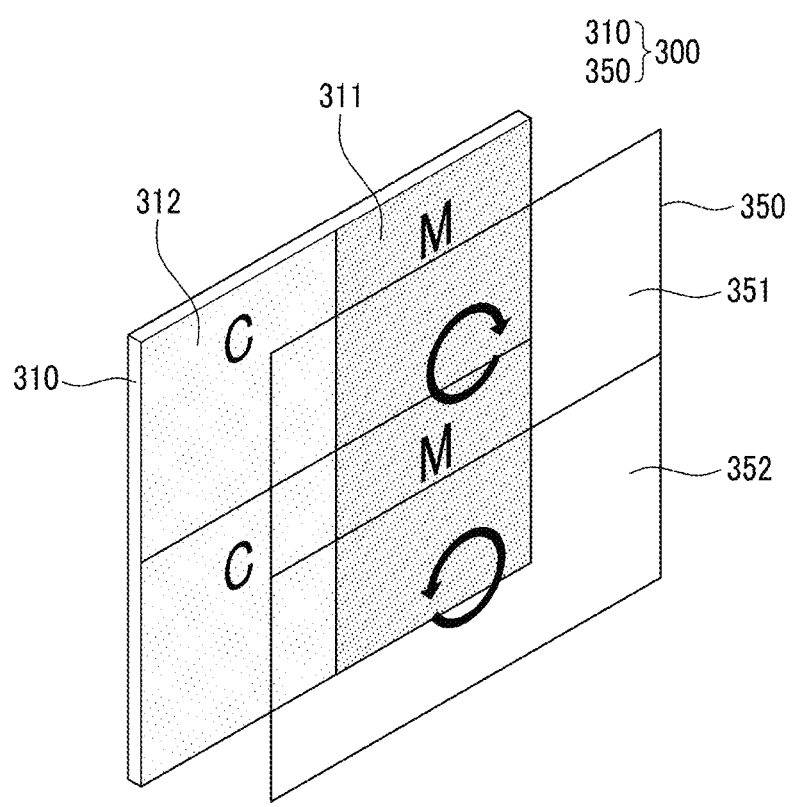

FIGS. 12 to 14 are enlarged perspective views schematically illustrating an alternative exemplary embodiment of a 3D image display panel according to the invention.

In the exemplary embodiment of FIG. 12, an arrangement of the first and second subpixels 311 and 312 of the display panel 310 is different from the arrangement of the first and second subpixels of the display panel of FIG. 1. In the exemplary embodiment shown in FIG. 1, all of the first subpixels 311 that display the magenta M and the second subpixels 312 that display the cyan C are alternately arranged substantially in a vertical direction and in a horizontal direction. However, in the display panel 310 of the exemplary embodiment of FIG. 12, the first subpixels 311 that display the magenta M are substantially linearly arranged in a vertical direction, and the second subpixels 312 that display the cyan C are substantially linearly arranged in the vertical direction.

The patterned circular polarizer 350 in the exemplary embodiment of FIG. 12 extends in a vertical direction as illustrated in FIG. 1 and includes a first circular polarization part 351 and a second circular polarization part 352 having widths corresponding to the widths of the subpixels 311 and 312.

FIGS. 13 and 14 illustrate alternative exemplary embodiments in which the patterned circular polarizer 350 extends substantially in a horizontal direction.

In such embodiments, as shown in FIGS. 13 and 14, the patterned circular polarizer 350 includes the first circular polarization part 351 and the second circular polarization part 352 which extend substantially in the horizontal direction, and the first circular polarization part 351 and the second circular polarization part 352 are alternately arranged. The first circular polarization part 351 and the second circular polarization part 352 transmit circularly polarized light having different directions, and in the exemplary embodiments of FIGS. 13 and 14, the first circular polarization part 351 transmits the right circularly polarized light, and the second circular polarization part 352 transmits the left circularly polarized light.

In the exemplary embodiments of FIGS. 13 and 14, vertical widths of the first circular polarization part 351 and the second circular polarization part 352 correspond to vertical widths of the first and second subpixels 311 and 312 of the display panel 310.

In the exemplary embodiments of FIGS. 13 and 14, arrangement structures of the first and second subpixels 311 and 312 in the display panel 310 are different from each other.

In the exemplary embodiment of FIG. 13, as in the exemplary embodiment of the display panel 310 of FIG. 1, all of the first subpixels 311 that display the magenta M and the second subpixels 312 that display the cyan C are alternately arranged in a vertical direction and in a horizontal direction.

In the exemplary embodiment of FIG. 14, as in the exemplary embodiment of the display panel 310 of FIG. 12, the first subpixels 311 that display the magenta M are substantially linearly arranged in the vertical direction, and the second subpixel 312 that display the cyan C are substantially linearly arranged in the vertical direction.

Hereinafter, a structure of an alternative exemplary embodiment of the glasses 200 according to the invention will be described with reference to FIG. 15.

Figure 15:
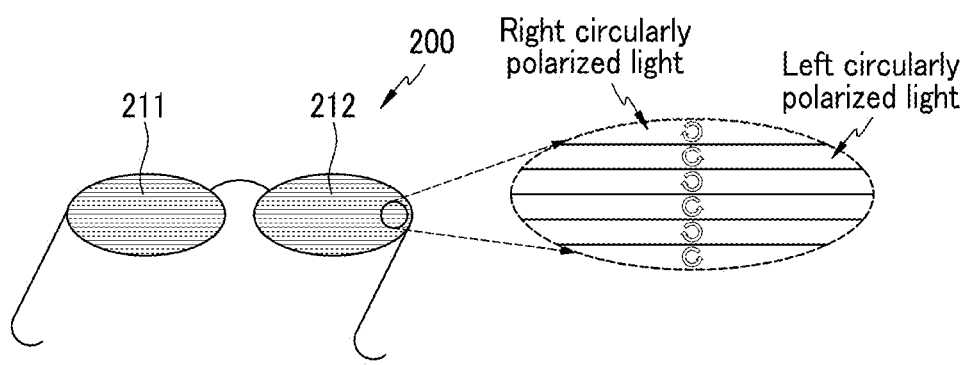
FIG. 15 is a schematic perspective view of an alternative exemplary embodiment of 3D glasses according to the invention.

FIG. 15 is a schematic perspective view of an exemplary embodiment of 3D glasses according to the invention.

Lenses 211 and 212 of the exemplary embodiment of the glasses 200 of FIG. 15 have a plurality of circular polarization patterns and a SG panel that turns on or off a region corresponding to each circular polarization pattern, as in the exemplary embodiment shown in FIG. 3. However, in the exemplary embodiment of FIG. 15, the plurality of circular polarization patterns extends substantially in a horizontal direction.

In such an embodiment, as shown in FIG. 15, the plurality of circular polarization patterns of the lenses 211 and 212 of the glasses includes a first pattern which extends substantially in a horizontal direction to transmit left circularly polarized light and a second pattern which extends substantially in a horizontal direction to transmit right circularly polarized light. The first pattern and the second pattern are alternately arranged, and widths of the first pattern and the second pattern are substantially small such that each pattern is not recognized by a viewer when the viewer wears the glasses 200.

The exemplary embodiment of the glasses 200 of FIG. 15 may be used together with the exemplary embodiments of the 3D image display panels 300 shown in FIGS. 1, 12 and 14. The glasses 200 of FIG. 15 may be used together with an exemplary embodiment of the 3D image display panel 300, in which the patterned circular polarizer 350 extends substantially in the horizontal direction as illustrated in FIGS. 13 and 14 or extends in the same direction (horizontal direction) as the circular polarization pattern of the glasses 200 of FIG. 15, and an exemplary embodiment of the 3D image display panel 300, in which the patterned circular polarizer 350 extends substantially in the vertical direction as illustrated in FIGS. 1 and 12 or extends substantially in a perpendicular direction with the extending direction of the circular polarization pattern of the glasses 200 of FIG. 15. The exemplary embodiment of the glasses 200 shown in FIG. 3 may be used together with the exemplary embodiments of the 3D image display panels 300 shown in FIGS. 1, 12, 13 and 14.

Hereinafter, exemplary embodiments, in which the patterned circular polarizer 350 of the 3D image display panel 300 and a plurality of circular polarization patterns of the glasses 200 include a plurality of layers, will be described with reference to FIGS. 16 and 17.

First, an exemplary embodiment, in which the patterned circular polarizer 350 of the 3D image display panel 300 includes a plurality of layers, will be described with reference to FIG. 16.

Figure 16:
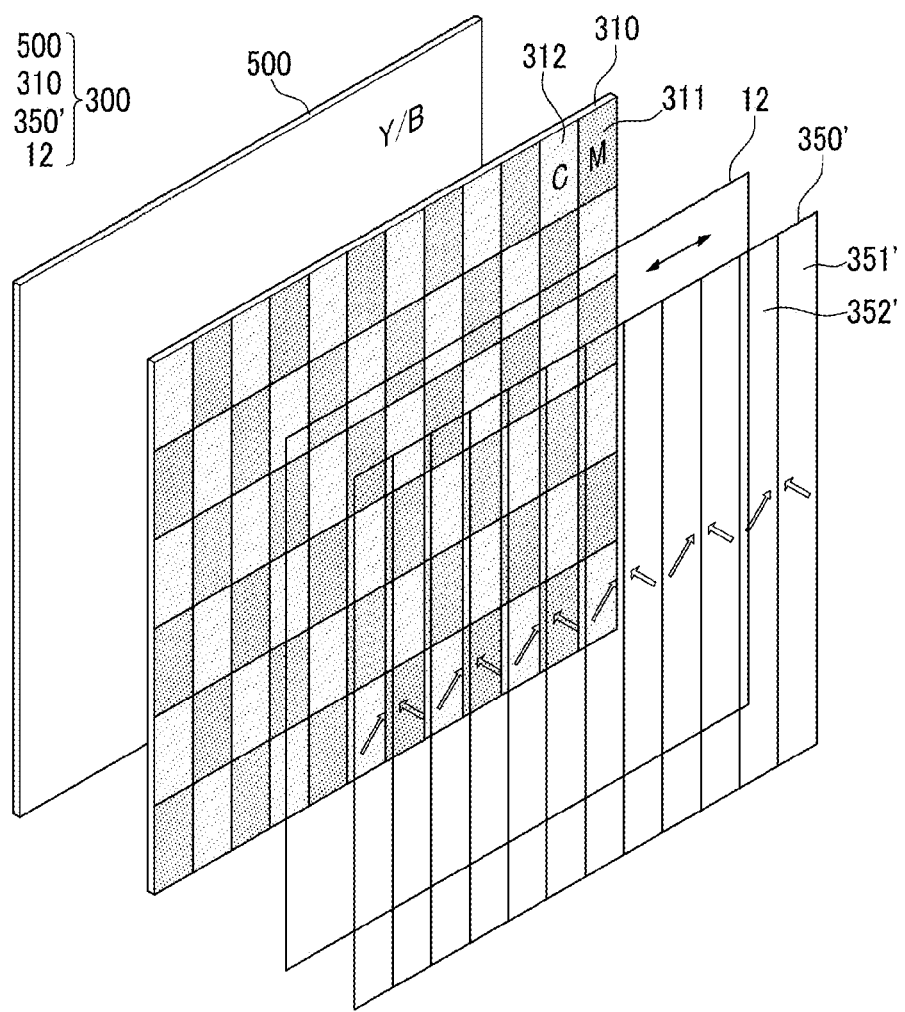
FIG. 16 is a schematic perspective view of an alternative exemplary embodiment of a display device according to the invention.

FIG. 16 is a schematic perspective view of an alternative exemplary embodiment of a display device according to the invention.

In an exemplary embodiment, as shown in FIG. 16, the patterned circular polarizer 350 of FIG. 1 provided on the front side of the display panel 310 includes an upper polarizer 12 and a patterned λ/4 plate 350'.

The upper polarizer 12 is disposed on, e.g., attached to, the front side of the display panel 310 and transmits linear polarized light having a predetermined direction. In an exemplary embodiment where a transmissive axis of the upper polarizer 12 has a horizontal direction, as shown in FIG. 16, the upper polarizer 12 transmits the linearly polarized light having a horizontal direction. In such an embodiment, the lower polarizer may transmit predetermined linearly polarized light or circularly polarized light, and when the lower polarizer transmits the predetermined linearly polarized light, the transmitting direction of the lower polarizer may be the same as or substantially vertical to the transmitting direction of the upper polarizer 12.

The patterned λ/4 plate 350' is disposed on, e.g., attached to, the front side of the upper polarizer 12.

The patterned λ/4 plate 350' includes a first λ/4 plate 351' and a second λ/4 plate 352' which extend substantially in a vertical direction, and the first λ/4 plate 351' and the second λ/4 plate 352' are alternately arranged therein. The first λ/4 plate 351' and the second λ/4 plate 352' have slow axes which are substantially perpendicular to each other, and may form an angle of 45 degrees with the transmissive axis of the upper polarizer 12.

In an alternative exemplary embodiment, the first λ/4 plate 351' and the second λ/4 plate 352' may extend substantially in a horizontal direction.

In such an embodiment, when the horizontal light passing through the upper polarizer 12 is incident to the first λ/4 plate 351' and the second λ/4 plate 352', right circularly polarized light and left circularly polarized light are emitted by the angle formed with the slow axis. As a result, the upper polarizer 12 and the patterned λ/4 plate 350' functions substantially the same as the patterned circular polarizer 350 of FIG. 1.

The first λ/4 plate 351' and the second λ/4 plate 352' of the patterned λ/4 plate 350' may be provided by aligning liquid crystal molecules in a predetermined direction, and the alignment directions of the liquid crystal molecules included in the first λ/4 plate 351' and the second λ/4 plate 352' may be different from each other.

Hereinafter, an alternative exemplary embodiment of the glasses 200, in which the circular polarization patterns of the glasses 200 include a plurality of layers, will be described with reference to FIG. 17.

Figure 17:
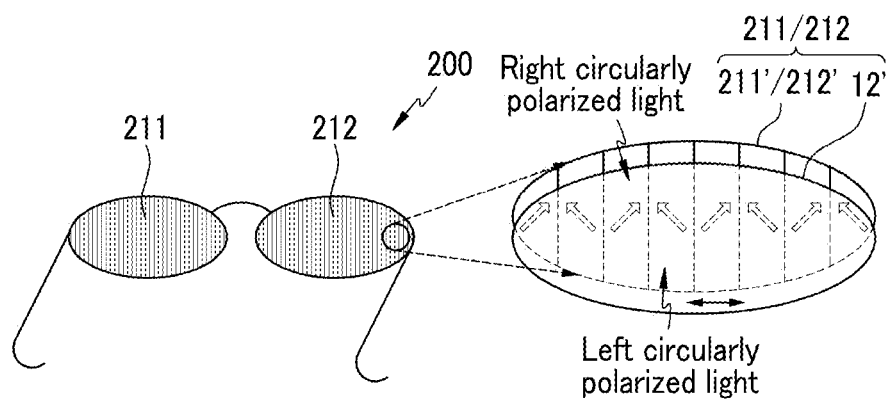
FIG. 17 is a schematic perspective view of another alternative exemplary embodiment of 3D glasses according to the invention.

FIG. 17 is a schematic perspective view of an alternative exemplary embodiment of 3D glasses according to the invention.

In an exemplary embodiment, as shown in FIG. 17, the plurality of circular polarization patterns in each of the lenses 211 and 212 of the glasses includes a linear polarization layer 12' and patterned λ/4 plates 211' and 212'.

In the glasses 200 of FIG. 17, each of the lenses 211 and 212 has a SG panel that turns on and off a region corresponding to each of the patterned λ/4 plates 211' and 212' for glasses.

The linear polarization layer 12' has a polarization characteristic of transmitting only linearly polarized light having one direction (e.g., the horizontal direction as shown in FIG. 17), and each of the patterned λ/4 plates 211' and 212' for glasses includes a first λ/4 plate 211' for glasses and a second λ/4 plate 212' for glasses which extend substantially in a vertical direction, and the first λ/4 plate 211' for glasses and the second λ/4 plate 212' for glasses are alternately arranged. The first λ/4 plate 211' for glasses and the second λ/4 plate 212' for glasses have slow axes which are substantially perpendicular to each other, and may form an angle of 45 degrees with the transmissive axis of the linear polarization layer 12'.

In an alternative exemplary embodiment, the first λ/4 plate 211' for glasses and the second λ/4 plate 212' for glasses may extend substantially in a horizontal direction.

In an exemplary embodiment, widths of the first λ/4 plate 211' for glasses and the second λ/4 plate 212' for glasses of each lens 211 or 212 are substantially small such that each pattern is not recognized by a viewer when the viewer wears the glasses 200.

In an exemplary embodiment, the patterned λ/4 plates 211' and 212' for glasses are disposed outside the lenses 211 and 212 of the glasses, and the linear polarization layer 12' is disposed inside the lenses 211 and 212 of the glasses. In such an embodiment, the SG panel may be disposed inside the linear polarization layer 12'.

The circularly polarized light is changed into the linearly polarized light by each of the patterned λ/4 plates 211' and 212' for glasses, and the changed linearly polarized light is transmitted when the polarization axis of the changed linearly polarized light is parallel to the transmissive axis of the linear polarization layer 12' or is blocked when the polarization axis of the changed linearly polarized light is vertical to the transmissive axis of the linear polarization layer 12'.

The exemplary embodiment of the glasses 200 shown in FIG. 17 may be used for the exemplary embodiment of the 3D image display panel 300 shown in FIG. 16 and the exemplary embodiment of the 3D image display panel 300 shown in FIGS. 1 and 12 to 14.

In such embodiments, the yellow Y light source and the blue B light source may be used as two colored light sources of the BLU 500, and the two colored color filters in the display panel 310 may be the magenta M color filter and the cyan C color filter, but not being limited thereto. In an alternative exemplary embodiment, different color combination may be used.

Hereinafter, an alternative exemplary embodiment, in which different combination is used, will be described with reference to FIG. 18.

Figure 18:
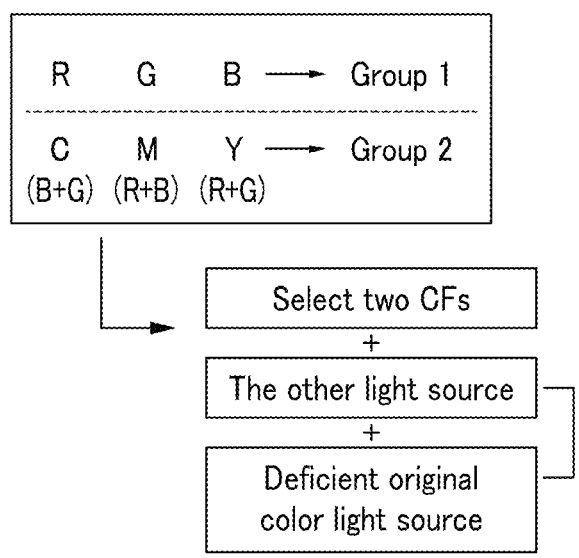
FIG. 18 is a diagram illustrating an exemplary embodiment of a method of selecting colors of a light source and a color filter in the display device according to the invention.

FIG. 18 is a diagram illustrating an exemplary embodiment of a method of selecting colors of a light source and a color filter in the display device according to the invention.

Hereinafter, two colors of light sources are referred to as a first color light source and a second color light source, and two colors of color filters are referred to as a third color filter and a fourth color filter.

Three primary colors of light include a first group including red, blue and green, and a second group include cyan C, magenta M and yellow Y, as illustrated in FIG. 18. As shown in FIG. 18, the cyan C, magenta M and yellow Y of the second group may be expressed by combinations of red, blue and green.

Two colors to be used as the color filters are selected from one group of the two groups of the three primary colors.

When the colors of the color filters are determined, one color remaining in the one group becomes the color of one of two light sources.

When the two colors selected as the color filters are expressed by the three primary colors of the different group, a common color of the three primary colors of the different group is determined as the color of the other of the two light sources.

Two colored color filters and two colored light sources may be determined as various combinations based on the method described above.

Other groups of three primary colors may be used in addition to the colors illustrated in FIG. 18.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A three-dimensional image display device comprising:
   a backlight unit comprising a first color light source and a second color light source, which are alternately turned on and off;
   a display panel disposed on a front side of the backlight unit and comprising a pixel, wherein the pixel of the display panel comprises:
      a first subpixel comprising a first color filter; and
      a second subpixel comprising a second color filter;
   a patterned circular polarizer disposed on a front side of the display panel, extending substantially in a first direction, wherein the patterned circular polarizer comprises a first circular polarization part and a second circular polarization part having widths substantially the same as widths of the first subpixel and the second subpixel, respectively; and
   glasses comprising a left lens and a right lens, wherein each of the left lens and the right lens comprises a plurality of circular polarization patterns, and a shutter glass panel which turns on and off each circular polarization pattern.

2. The three-dimensional image display device of claim 1, wherein
   the first circular polarization part transmits right circularly polarized light, and
   the second circular polarization part transmits left circularly polarized light.

3. The three-dimensional image display device of claim 2, wherein
   the first circular polarization part and the second circular polarization part comprise cholesteric liquid crystals.

4. The three-dimensional image display device of claim 2, wherein the first circular polarization part and the second circular polarization part comprise:
   an upper polarizer which transmits linearly polarized light in a predetermined direction; and
   a patterned $\lambda/4$ plate positioned on the upper polarizer, extending substantially in the first direction, and comprising a first $\lambda/4$ plate and a second $\lambda/4$ plate having slow axes, and
   the slow axis of the first $\lambda/4$ plate and the slow axis of the second $\lambda/4$ plate are substantially perpendicular to each other.

5. The three-dimensional image display device of claim 1, wherein
   the plurality of circular polarization patterns comprises:
   a first pattern extending substantially in a second direction and which transmits left circularly polarized light; and
   a second pattern extending in the second direction and which transmits right circularly polarized light.

6. The three-dimensional image display device of claim 5, wherein
   the second direction is substantially the same as the first direction or is substantially perpendicular to the first direction.

7. The three-dimensional image display device of claim 5, wherein
   the plurality of circular polarization patterns of the glasses comprises:
   a patterned $\lambda/4$ plate extending substantially in the second direction and comprising a first $\lambda/4$ plate and a second $\lambda/4$ plate having slow axes; and
   a linear polarization layer disposed inside the patterned $\lambda/4$ plate, and
   the slow axes of the first $\lambda/4$ plate of the glasses and the second $\lambda/4$ plate of the glasses are substantially perpendicular to each other.

8. The three-dimensional image display device of claim 1, wherein
   the first subpixel and the second subpixel are alternately arranged substantially in a vertical direction and in a horizontal direction.

9. The three-dimensional image display device of claim 1, wherein
   the first subpixel and the second subpixel are substantially linearly arranged in the first direction.

10. The three-dimensional image display device of claim 1, wherein
    the first color light source is a yellow light source,
    the second color light source is a blue light source, the first color filter is a cyan color filter, and
the second color filter is a magenta color filter.

11. A driving method of a three-dimensional image display device, the driving method comprising:
- displaying a first colored left-eye image by a pixel;
- displaying a first colored right-eye image by the pixel; and
- displaying a second colored right-eye image and a second colored left-eye image by a first subpixel and a second subpixel of the pixel, respectively,
- wherein the three-dimensional image display device comprises:
  - a backlight unit comprising a first color light source and a second color light source, which are alternately turned on and off;
  - a display panel disposed on a front side of the backlight unit and comprising the pixel, wherein the pixel of the display panel comprises:
    - the first subpixel comprising a first color filter; and
    - the second subpixel comprising a second color filter;
  - a patterned circular polarizer disposed on a front side of the display panel, wherein the patterned circular polarizer comprises a first circular polarization part and a second circular polarization part; and
  - glasses comprising a left lens and a right lens, wherein each of the left lens and the right lens comprises a plurality of circular polarization patterns, and a shutter glass panel which turns on and off each circular polarization pattern, and
- wherein the first color of the first colored left-eye image and the first colored right-eye image is acquired by combining the color of a first color filter and the color of the second color filter of the pixel.

12. The driving method of a three-dimensional image display device of claim 11, wherein
the displaying the first colored left-eye image comprises turning off the right lens of the glasses, and turning on the left lens.

13. The driving method of a three-dimensional image display device of claim 12, wherein
the displaying the first colored right-eye image comprises turning off the left lens of the glasses, and turning on the right lens.

14. The driving method of a three-dimensional image display device of claim 13, wherein
the displaying the second colored right-eye image and the second colored left-eye image by the first subpixel and the second subpixel, respectively, comprises:
transmitting only first circularly polarized light through the left lens of the glasses; and
transmitting only second circularly polarized light through the right lens of the glasses.

15. The driving method of a three-dimensional image display device of claim 14, wherein
the first circular polarization part and the second circular polarization part of the patterned circular polarizer are disposed on the front side of the display panel, extend substantially in a first direction, and have widths substantially the same as the widths of the first subpixel and the second subpixel, respectively.

16. The driving method of a three-dimensional image display device of claim 15, wherein
the plurality of circular polarization patterns of the glasses comprises:
a first pattern extending substantially in a second direction and which transmits left circularly polarized light; and
a second pattern extending substantially in the second direction and which transmits right circularly polarized light.

17. The driving method of a three-dimensional image display device of claim 16, wherein
the left lens is selectively opened to transmit one of the left circularly polarized light and the right circularly polarized light from the plurality of circular polarization patterns, and
the right lens is selectively opened to transmit the other of the left circularly polarized light and the right circularly polarized light from the plurality of circular polarization patterns.

18. The driving method of a three-dimensional image display device of claim 11, wherein
the first color light source is a yellow light source,
the second color light source is a blue light source,
the first color filter is a cyan color filter, and
the second color filter is a magenta color filter.

* * * * *